E. MECHAU.
CINEMATOGRAPHIC APPARATUS.
APPLICATION FILED AUG. 20, 1921.

1,421,523.

Patented July 4, 1922.
2 SHEETS—SHEET 1.

Witnesses:
Inventor:

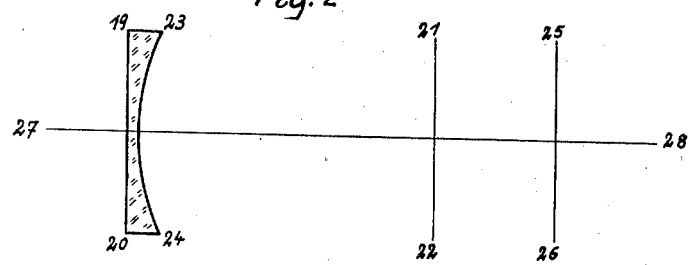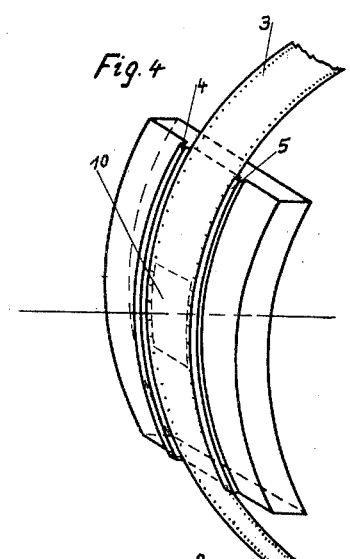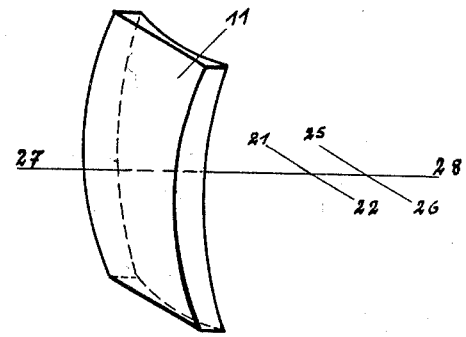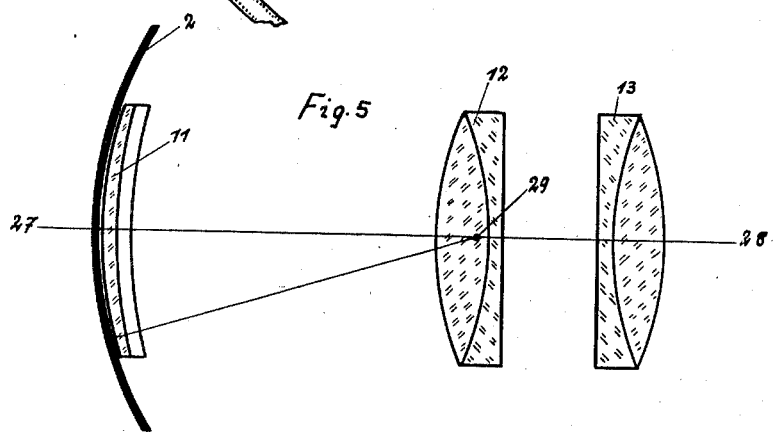

UNITED STATES PATENT OFFICE.

EMIL MECHAU, OF RASTATT, GERMANY.

CINEMATOGRAPHIC APPARATUS.

1,421,523.   Specification of Letters Patent.   Patented July 4, 1922.

Application filed August 20, 1921. Serial No. 493,979.

*To all whom it may concern:*

Be it known that I, EMIL MECHAU, a citizen of the Republic of Germany, residing at Rastatt, Germany, have invented Improvements in Cinematographic Apparatus (for which I have filed an application in Germany, August 16, 1920, Serial-No. M. 70,436), of which the following is a specification.

My invention relates to improvements in cinematographic apparatus in which a flexible picture band such as, for example, a filmband is employed and moved continuously through the projector gate. To obtain a perfect compensation of the picture movement by means of suitable optical devices (as for instance rotating mirrors, lenses or prisms) it is preferable to feed the picture band in a cylindrically curved guide.

The object of my invention is to provide in such apparatus means for projecting exactly and sharply the cylindrically curved picture band on to a projection screen of the usual plane construction by employing projection lenses of great rapidity.

For this purpose a cylindrically curved guide is fitted for the picture band, and near to the latter is placed a lens system with at least one torical surface adapted to produce of the cylindrically curved picture a virtual image of spherical curvature. In combining this lens system with a projection lens having a spherically curved field of image, as for example an objective of the known Petzval type, the picture band will be sharply reproduced on the projection screen.

Generally stated, the focal lengths of the said lens system arranged near to the picture band differ in two sections perpendicular to each other. Besides the one torical surface the lens system may have surfaces of any form, e. g. spherical, aspherical or cylindrical, and may also be composed of different lenses cemented or not cemented.

Another object is to choose the cylindrical curvature of the guide in such a way that the axis of curvature passes through that point of the optical axis for which the whole optical system composed of the mentioned projection lens and inserted lens system is practically free from distortion in respect to the film side. The position of this point depends on the construction and calculation of the combined projection lens and inserted lens system, but will generally be in one of the pupils (entrance respectively exit pupil) or in one of the cardinal points of the whole optical system or in the neighborhood of them.

A construction of an apparatus according to my invention is illustrated, by way of example in the accompanying drawings in which—

Figure 2 shows the manner in which a lens with one cylindrical and one torical surface originates.

Figure 3 is a view of a lens with one cylindrical and one torical surface.

Figure 4 is a view of a cylindrical guide for the filmband.

Figure 5 shows the position of the axis of curvature of a cylindrical guide in respect to an optical system composed of an objective and another lens system.

Figure 1:
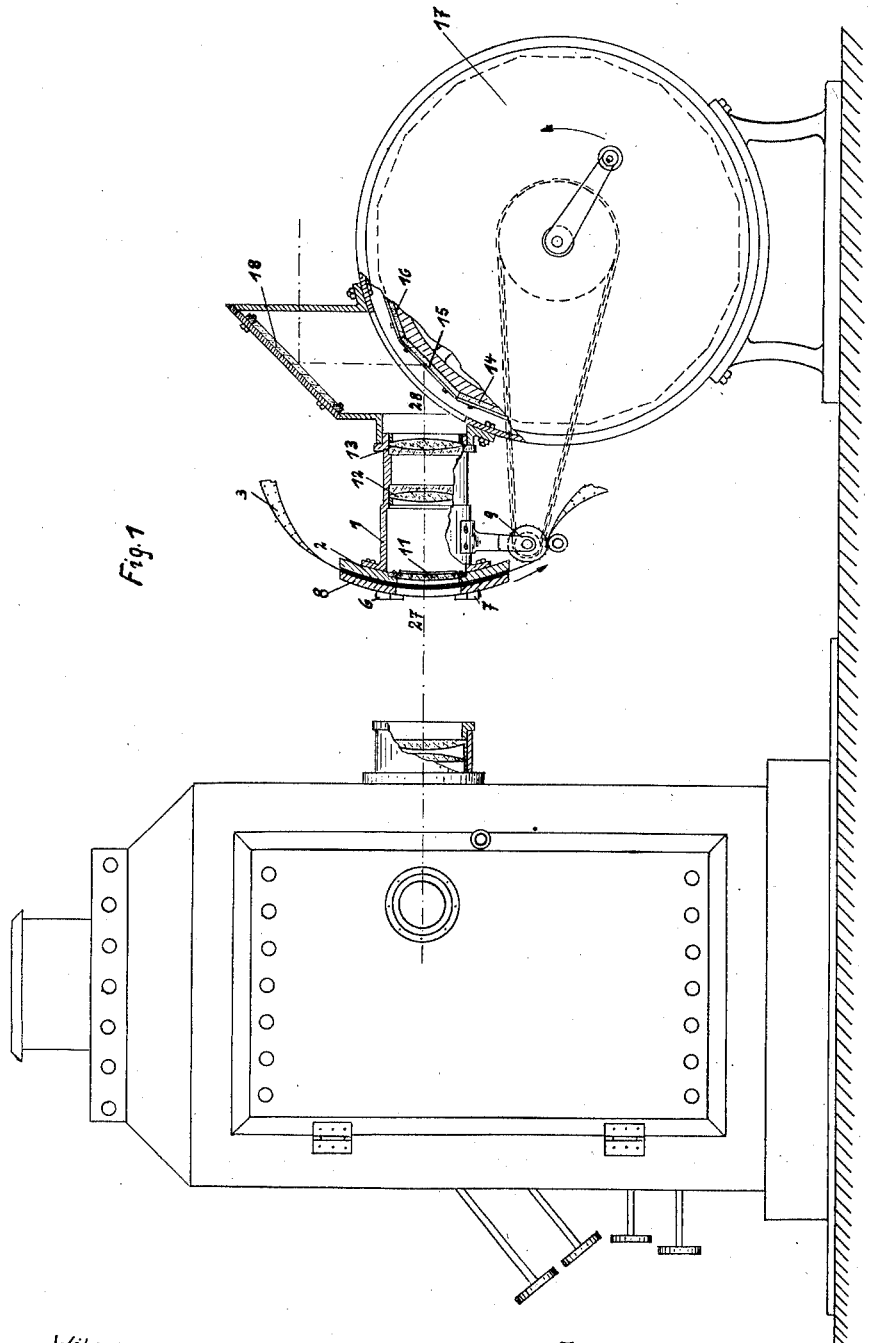
Figure 1 is a view of a motion picture apparatus containing my improvements.

As illustrated, on the one end of a tube 1 a cylindrically curved guide 2 is mounted along which a filmband 3 is conducted between two bars 4 and 5 fixed on the guide 2. By means of two joints 6 and 7 a cover 8 can be removed in order to put in the filmband 3. A sprocket-wheel 9 moves the filmband 3 before a projector gate 10 being in the guide 2. Close to the projector gate 10 a lens 11 is arranged the form of which is visible in Figure 3.

On the other end of the tube 1 is placed a projection lens system composed of two cemented lenses 12 and 13 which reproduces, in combination with the said lens 11, the filmpicture on a projection screen by means of silvered mirrors 14, 15, 16 and so on, revolving in suitable manner in a drum 17 and thereby compensating the film movement. The rays are finally reflected to the projection screen by a fixed mirror 18.

The lens 11, as represented in Figure 3, will originate by rotating in Figure 2 a straight line 19—20 about an axis 21—22 whereby a cylindrical surface will be produced. By rotating a circular curve 23—24 about an axis 25—26 a torical surface will result, on the optical axis 27—28 the distance of the axis 25—26 from the curve 23—24 being greater than the radius of this curve 23—24.

From Figure 3 it is easily recognised that the lens 11 in a horizontal cross section is of plano concave form and in a perpendicular cross section of meniscus form.

In Figure 5 the axis of curvature of the guide 2 is passing through a point 29 for which in the whole optical system composed of the lenses 11, 12 and 13 the distortion is eliminated in respect to the film side.

I claim as my invention:

1. In cinematographic projectors with continuously moving flexible picture band in combination, a projection lens with spherically curved field of image, a lens system with at least one torical surface, arranged near to the picture band between the latter and the projection lens and adapted to produce of the cylindrically curved picture band a virtual image of spherical curvature, and a cylindrically curved guide for the flexible picture band.

2. In cinematographic projectors with continuously moving flexible picture band in combination, a projection lens with spherically curved field of image, a lens system with at least one torical surface, arranged near to the picture band between the latter and the projection lens and adapted to produce of the cylindrically curved picture band a virtual image of spherical curvature, and a cylindrically curved guide for the flexible picture band, the axis of curvature passing through that point of the optical axis for which the whole optical system composed of the projection lens and the said lens system is practically free from distortion in respect to the film side.

3. In cinematographic projectors with continuously moving flexible picture band in combination, a projection lens with spherically curved field of image, a lens system with one cylindrical and one torical surface, arranged near to the picture band between the latter and the projection lens and adapted to produce of the cylindrically curved picture band a virtual image of spherical curvature, and a cylindrically curved guide for the flexible picture band, the axis of curvature passing through that point of the optical axis for which the whole optical system composed of the projection lens and the said lens system is practically free from distortion in respect to the film side.

EMIL MECHAU.